United States Patent
Narayanan et al.

(10) Patent No.: US 8,769,611 B2
(45) Date of Patent: Jul. 1, 2014

(54) METHODS AND APPARATUS FOR PROVIDING PMIP KEY HIERARCHY IN WIRELESS COMMUNICATION NETWORKS

(75) Inventors: Vidya Narayanan, San Diego, CA (US); Fatih Ulupinar, San Diego, CA (US); Jun Wang, La Jolla, CA (US); Lakshminath Reddy Dondeti, San Diego, CA (US); Raymond Tah-Sheng Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1178 days.

(21) Appl. No.: 12/131,039

(22) Filed: May 31, 2008

(65) Prior Publication Data

US 2008/0298595 A1  Dec. 4, 2008

Related U.S. Application Data

(60) Provisional application No. 60/941,256, filed on May 31, 2007.

(51) Int. Cl.
    *G06F 7/04* (2006.01)

(52) U.S. Cl.
    USPC .......................................................... 726/2

(58) Field of Classification Search
    USPC .......................................................... 726/2
    See application file for complete search history.

(56) References Cited

U.S. PATENT DOCUMENTS

| | | | |
|---|---|---|---|
| 6,760,444 B1 | 7/2004 | Leung | |
| 6,785,823 B1 | 8/2004 | Abrol et al. | |
| 7,370,362 B2 * | 5/2008 | Olson et al. | 726/25 |
| 2004/0114553 A1 * | 6/2004 | Jiang et al. | 370/328 |
| 2004/0114559 A1 | 6/2004 | Wang | |
| 2005/0289643 A1 | 12/2005 | Sato et al. | |

(Continued)

FOREIGN PATENT DOCUMENTS

| | | |
|---|---|---|
| JP | 2009515450 A | 4/2009 |
| JP | 2010500803 A | 1/2010 |

(Continued)

OTHER PUBLICATIONS

Bedekar, A. et al.: "A Protocol for Network-based Localized Mobility Management; draft-singh-netlmm-protocol-01.txt" IETF Standard—Working Draft, Internet Engineering Task Force, IETF, CH, No. 1 (Feb. 13, 2007) XP015050425, ISSN: 0000-0004.
Gundavelli, S. et al.: "Proxy Mobile IPv6; draft-sgundave-mip6-proxymip6-02.txt," IETF Standard—Working Draft, Internet Engineering Task Force, IETF, CH, No. 2 (Mar. 5, 2007) XP015050403, ISSN: 000-0004.

(Continued)

*Primary Examiner* — Teshome Hailu
(74) *Attorney, Agent, or Firm* — Won Tae Kim

(57) ABSTRACT

A method is provided for securing a PMIP tunnel between a serving gateway and a new access node through which an access terminal communicates. A PMIP key hierarchy unique to each access terminal is maintained by the gateway. The gateway uses a first node key to secure PMIP tunnels when authentication of the access terminal has been performed. A PMIP key is generated based on the first node key and the PMIP key is sent to the new access node to assist in establishing and securing a PMIP tunnel between the gateway and the new access node. Otherwise, when authentication of the access terminal has not been performed, the gateway generates a second node key and sends it to an intermediary network node which then generates and sends a PMIP key to the new access node. This second key is then used to secure the PMIP tunnel.

66 Claims, 10 Drawing Sheets

(56) References Cited

U.S. PATENT DOCUMENTS

| | | | |
|---|---|---|---|
| 2007/0107047 A1* | 5/2007 | Mukherjee et al. | 726/4 |
| 2008/0059792 A1* | 3/2008 | Feder et al. | 713/155 |
| 2008/0263631 A1* | 10/2008 | Wang et al. | 726/2 |
| 2009/0200862 A1* | 8/2009 | Matthys | 305/143 |
| 2011/0010538 A1 | 1/2011 | Falk et al. | |

FOREIGN PATENT DOCUMENTS

| | | |
|---|---|---|
| JP | 2010515315 A | 5/2010 |
| RU | 2005113239 | 11/2005 |
| RU | 2292648 | 1/2007 |
| TW | 254546 B | 5/2006 |
| TW | I280023 B | 4/2007 |
| WO | WO03094438 A1 | 11/2003 |
| WO | WO2004034720 A2 | 4/2004 |
| WO | 2007011995 | 1/2007 |
| WO | 2008080420 A1 | 7/2008 |

OTHER PUBLICATIONS

Leung, K. et al.: "Mobility Management using Proxy Mobile IPv4; draft-leung-mip4-proxy-mode-00.txt," IETF Standard—Working Draft, Internet Engineering Task Force. IETF, CH (Feb. 26, 2006) XP015044337, ISSN: 000-0004.

Nakhjiri, M. et al.: "EAP based Proxy Mobile IP key bootstrapping for WiMAX: draft-nakhjiri-pmip-key-01.txt." IETF Standard—Working Draft, Internet Engineering Task Force, IETF, CH, No. 1 (Jan. 1, 2006) XP015044435, ISSN: 0000-0004.

International Search Report, PCT/US2008/065562—International Search Authority—European Patent Office, Mar. 19, 2009.

Written Opinion, PCT/US2008/065562—International Search Authority—European Patent Office, Mar. 19, 2009.

Raman V., et al., "A protocol for Network-based Localized Mobility Management; draft-raman-netlmm-protocol-00.txt", IETF NETLM Working Group Internet Draft Aug. 2006 ,Feb. 2006.

Taiwan Search Report—TW097120507—TIPO—Jan. 21, 2012.

* cited by examiner

METHODS AND APPARATUS FOR PROVIDING PMIP KEY HIERARCHY IN WIRELESS COMMUNICATION NETWORKS

CLAIM OF PRIORITY UNDER 35 U.S.C. §119

The present Application for Patent claims priority to U.S. Provisional Application No. 60/941,256 entitled "Methods and Apparatus for Providing Key Hierarchy and Computation in Wireless Communication Networks" filed May 31, 2007, and assigned to the assignee hereof and hereby expressly incorporated by reference herein.

BACKGROUND

1. Field

At least one feature relates to communication systems, and, more particularly, to a method for facilitating secure proxy mobile IP (PMIP) key generation and distribution within a wireless network.

2. Background

In the evolution of various wireless communication networks within 3GPP2, one type of network architecture is known as an ultra mobile broadband (UMB) network and is intended to improve the CDMA2000 mobile phone standard for next generation applications and requirements. UMB packet data networks are based upon Internet (TCP/IP) networking technologies running over a next generation radio system and is intended to be more efficient and capable of providing more services than the technologies it replaces. UMB is intended to be a fourth-generation (4G) technology and uses a high bandwidth, low latency, underlying TCP/IP network with high level services such as voice built on top. The much greater amount of bandwidth (in comparison to previous generations), and much lower latencies, enable the use of various application types that have previously been impossible, while continuing to deliver high quality (or higher quality) voice services.

UBM networks have a less centralized management of its network access nodes, known as evolved base stations (eBS). The access nodes may be coupled to a local or collocated session reference network controller (SRNC). Such access nodes and/or SRNC may perform many of the same functions as the base station (BS) and base station controller (BSC) in a conventional CDMA network. Consequently, due to the additional operations performed closer to the wireless interface by the access node (eBS) and SRNC in a UMB architecture, several problems occur in trying to maintain security of the access nodes and SRNC. One such problem is supporting and securing communications as an access terminal roams to different networks away from its home network.

Mobile IP (MIP) specifies a protocol for a mobile node (access terminal) to receive packets destined to its home IP address even when the mobile node (access terminal) is not present in its home network. It specifies registration request (RRQ) and response (RRP) messages between the mobile node (access terminal) and a Home Agent (HA). The HA then receives packets on behalf of the mobile node and tunnels the packets to the present location of the mobile node (access terminal). The RRQ and RRP messages are authenticated using key shared by the mobile node (access terminal) and its home agent.

In some cases, such where the mobile node (access terminal) connecting to the network does not have a Mobile IP stack but requires mobility services, the network may have to rely on a proxy (called the Proxy Mobile Node, PMN) to generate the registration requests and process the registration responses on behalf of the mobile node (access terminal). To ensure Mobile IP compatible behavior, the control packets from the PMN must be sent via the current subnet of the mobile node (access terminal). So the MIP control packets generated by the PMN are tunneled via an assistant function that resides in the current subnet of the mobile node (located say in a foreign agent or an access node). Thus the PMN (and the PMN-HA key) can reside in a single/secure location even as the mobile node (access terminal) moves or roams from one subnet to another.

Consequently, a way is needed to generate and distribute keys for PMIP tunnels within a network.

SUMMARY

A first method operational an access gateway is provided, comprising: (a) receiving a request to change a Proxy Mobile Internet Protocol (PMIP) tunnel binding for an access terminal from a first access node to a second access node; (b) generating a first node key; (c) sending the first node key to an intermediary network node that can generate and provide a first PMIP key to the second access node; and/or (d) establishing a PMIP tunnel between the gateway and the second access node secured the first PMIP key. The method may further comprise (e) determining whether the access terminal has been authenticated through the second access node; (f) generating and sending the first node key only if the access terminal has not been authenticated. Wherein, if the access terminal has been authenticated, further comprising: (g) generating a second node key; (h) generating a second PMIP key as a function of second node key; and/or (i) sending the second PMIP key to the second access node. The intermediary network node is a session reference network controller (SRNC). The first node key and second node key may be randomly selected and independent from each other or they may be based on a root key.

The method may further comprise maintaining a PMIP key hierarchy associated with the access terminal (AT) and used to secure PMIP tunnels to network nodes serving the access terminal, wherein the key hierarchy includes the first node key. The PMIP key hierarchy may include a randomly selected root key from which the first node key is derived. The root key for the PMIP key hierarchy may be unknown to the access terminal. The PMIP key hierarchy may be independent of a primary key hierarchy known to the access terminal and used to authenticate the access terminal. The second access node may be an enhanced base station (eBS) that provides wireless connectivity to the access terminal. The gateway operates in an Ultra Mobile Broadband (UMB) compatible network.

A second method operational an access gateway is provided, comprising: (a) receiving a request to change a Proxy Mobile Internet Protocol (PMIP) tunnel binding for an access terminal from a first access node to a second access node; (b) generating a first node key; (c) generating a first PMIP key as a function of first node key; (d) sending the first PMIP key to the second access node; and/or (e) establishing a PMIP tunnel between the gateway and the second access node secured the first PMIP key. The method may further comprise: (f) determining whether the access terminal has been authenticated through the second access node; and (g) generating and sending the first node key only if the access node has been authenticated. Wherein if the access terminal has not been authenticated, the method may further comprise: (h) generating a second node key; and/or (i) sending the second node key to an intermediary network node that can generate and provide a second PMIP key to the second access node. The intermediary network node may be a session reference network controller (SRNC). The second access node is may be enhanced base station (eBS). The method may further comprise maintaining a PMIP key hierarchy associated with the access terminal (AT) and used to secure PMIP tunnels to network nodes serving the access terminal, wherein the key hierarchy includes the first node key. Wherein the PMIP key hierarchy includes a randomly selected root key from which the first node key is derived.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
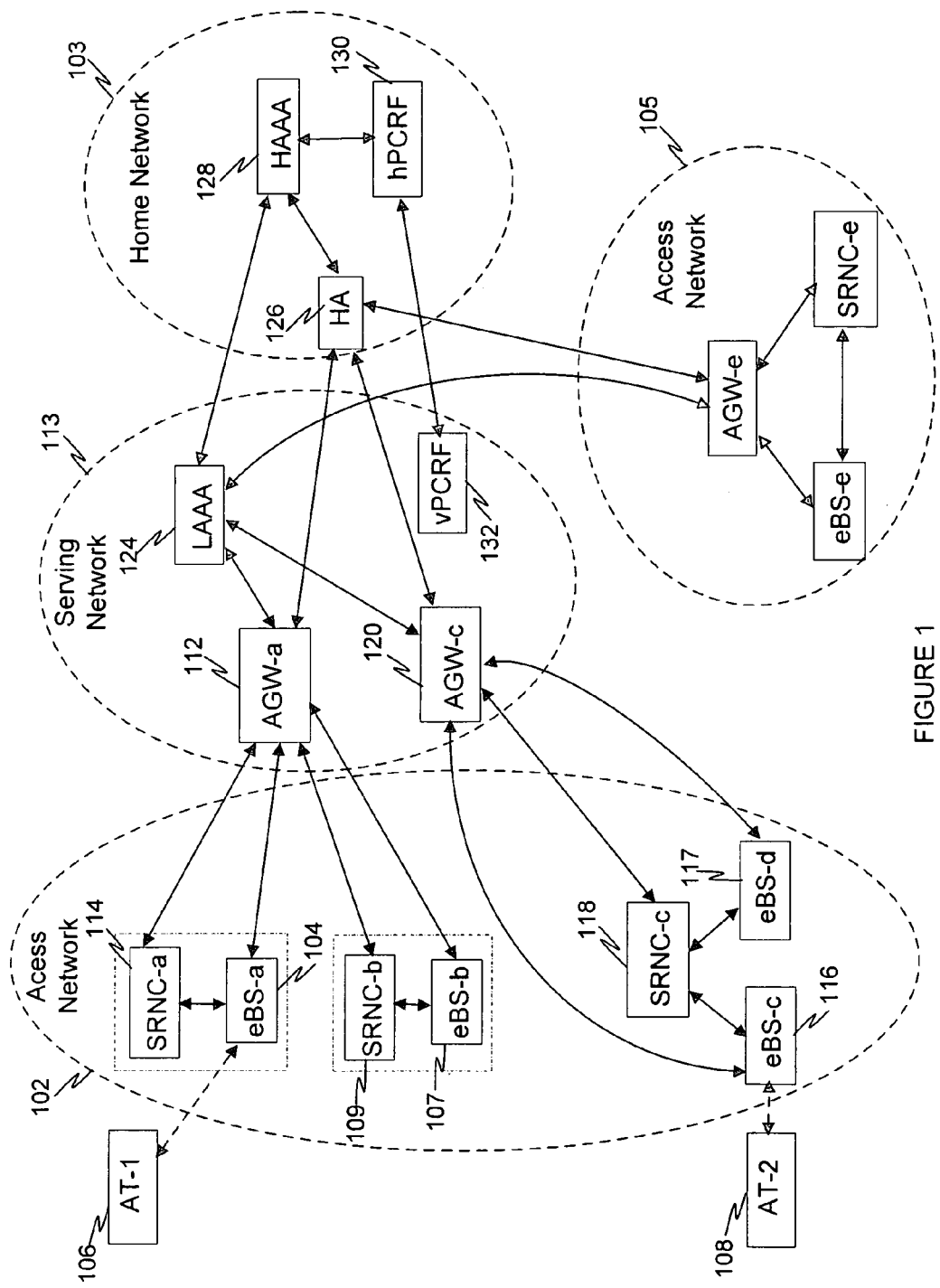
FIG. 1 is a block diagram of a UMB network in which one or more features of secure PMIP key distribution may be implemented according to one example.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the following description, certain terminology is used to describe certain features. The terms "access terminal" and "communication device" may be interchangeably used to refer to a mobile device, mobile phone, wireless terminal, and/or other types of mobile or fixed communication apparatus capable of communicating over a wireless network.

One aspect provides a method for securing a PMIP tunnel between a serving network gateway and access network node. A PMIP key hierarchy is maintained by the gateway. The gateway uses a first node key to secure PMIP tunnels when authentication of the access terminal has been performed. Otherwise, the gateway uses a second node key to secure PMIP tunnels when authentication of the access terminal has not been performed.

Network Environment

FIG. 1 is a block diagram of a UMB network in which one or more features of secure PMIP key distribution may be implemented according to one example. A UMB network may use a flat architecture that does not rely on a centralized entity, such as a Base Station Controller (BSC), to coordinate connections across the UMB's evolved base station (eBS). An eBS may combine the functions of a traditional base station, a BSC, and some functions of the packet-data serving node (PDSN) into a single node, making the deployment of the UMB network simpler. As the number of components are reduced (in comparison to prior art networks), the UMB network may be more reliable, more flexible, easier to deploy and/or less costly to operate. For example, in legacy networks, the BS, BSC, PDSN and mobile IP home agent (HA) all cooperate to serve user traffic. UMB networks reuse most of the core network infrastructure but consolidate functions in fewer network components. Combining these functions into fewer nodes reduces latency, decreases capital and maintenance costs, and reduces the complexity of interactions between the nodes to deliver end-to-end QoS.

This example illustrates how a UMB access network 102 and serving network 113 may provide wireless network access to a plurality of access terminals AT 106 and 108 (e.g., while reusing a core network infrastructure (e.g., Home Network 103). The serving network 113 may be the "home" network for ATs 106 and 108 but the ATs may also roam or visit other networks 105 and obtain wireless network connectivity from such other networks.

In this example, the access network 102 includes a first eBS 104 and a second eBS 107 (broadly referred to as "network access nodes") that allow one or more access terminals (AT-1) 106 to connect with the serving network 113 and home network 103. The first eBS 104 may be coupled to a first session reference network controller (SRNC) 114 (broadly referred to as "network controller") and a first access gateway (AGW) 112 (broadly referred to as "network gateway node") in the serving network 113 which couples to the home network infrastructure 103. Similarly, the second eBS 107 may be coupled to a second SRNC 109 and the first AGW 112. The serving network 113 may include the gateways AGW-a 112 and AGW-b 120 that are coupled to the local authentication, authorization, and accounting server (LAAA) 124 and a visiting policy control and resource function (vPCRF) 132 to facilitate communications and/or connectivity for the eBSs and ATs. The home network 103 may include a home agent (HA) 126, a home AAA (HAAA) 128, and a home PCRF (hPCRF) 130. Additionally, other access networks 105 may also be coupled to the HA 126 and/or LAAA 124 to provide wireless network connectivity to access terminals.

In various implementations, the UMB access network 102 may also include other eBSs 116 and 117 coupled to a SRNC 118 which is coupled to a second gateway AGW 120 that may provide wireless network connectivity to the AT-2 108. The networks 102, 113, 105, and/or 103 are intended as an example of a communication system in which one or more novel features described herein may operate. However, the devices and/or the functionality of those devices in these networks may be located in of the other networks shown (or a different network) without departing from the operation and features described herein.

According to various examples, the ATs 106 and/or 108 may be wireless communication devices, mobile phones, wireless terminals, and other types of mobile and/or wireless devices that support wireless radio connectivity via a UMB network.

The eBSs 104, 107, and 116 support the UMB air interface. The eBSs 104, 107 and/or 116, may include UMB physical and/or MAC protocols and may perform radio resource management, radio channel management, layer 2 ciphering, and/or IP header compression (e.g., ROHC).

The gateways AGWs 112 and/or 120 may provide Layer 3 IP connectivity to the home network 103. The gateways AGWs 112 and/or 120 may include various functions such as authentication, idle state buffering, and/or proxy mobile IP client. For instance, the gateways AGWs 112 and/or 120 may include IP Address Management, Foreign Agent (FA) for MIPv4, DHCP Relay, Proxy Mobile Internet Protocol (PMIP) client, Internet Packet (IP) packet classification/policing, EAP authenticator, and/or AAA client.

The SRNCs 114, 109 and 118 may control various functions in support of radio resource control, including session information storage, paging functions, and location management. The SRNC functions may include, for example, (a) air interface session information storage, (b) paging controller, (c) location management, and/or (d) EAP authenticator for ATs. The first SRNC 114 may maintain radio-access-specific information for the AT 106, while the second SRNC 118 may maintain radio-access-specific information for the AT 108. A SRNC may be responsible for maintaining the session reference (e.g., session storage point for negotiated air-interface context), supporting idle-state management, and providing paging-control functions when the AT is idle. The SRNC may also be responsible for access authentication of the AT. The SRNC function may be hosted by, or collocated with, an eBS or may be located in a separate (radio-less) entity. Note that the SRNC may be implemented both in a centralized or distributed configuration. In a centralized configuration, a single SRNC 118 is connected with several eBSs 116 and 117 and an AGW 120. In a distributed configuration, each eBS includes an SRNC, such as in eBS-a 104 and SRNC-a 114.

The authentication, authorization, and accounting (AAA) services for the home network 103 may be divided between a home agent 126, a local AAA (LAAA) 124 and a home AAA (HAAA) 128. The HAAA 128 may be responsible for the authentication, authorization, and accounting associated with the AT's 106, 108, 110 and/or 112 use of the network resources. A home agent (HA) 126 may provide a mobility solution that supports, for example, Client Mobile IP (CMIP) and/or Proxy Mobile IP (PMIP) and may also facilitate inter-technology mobility.

A policy control and resource function (PCRF) may store and distribute policies for the ATs 106 and/or 108. In one implementation, a home PCRF (hPCRF) 130 may be responsible for home network policies and a visiting PCRF (vPCRF) 132 may be responsible for visiting network policies. The hPCRF 130 and vPCRF 132 provide local and visiting rules, respectively, to the AGWs 112 and 120. These rules may include, for example, (a) detection of packets belonging to a service data flow, (b) providing policy control for a service data flow, and/or (c) providing applicable charging parameters for a service data flow.

In one example, the AT-1 106 may be authenticated by sending an authentication request via its serving eBS-a 104 which passes through AGW-a 112 to LAAA 124 and HAAA 128. Once authenticated, traffic to and/or from the AT-1 106, AGW-a 112 and HA 126.

While various examples may be illustrated from the point of view of a UMB network, the features described herein may be applicable to other types of networks, such a WiMAX and Long Term Evolution (LTE) networks, among others.

Authentication Using Extendible Authentication Protocol (EAP)

Figure 10:
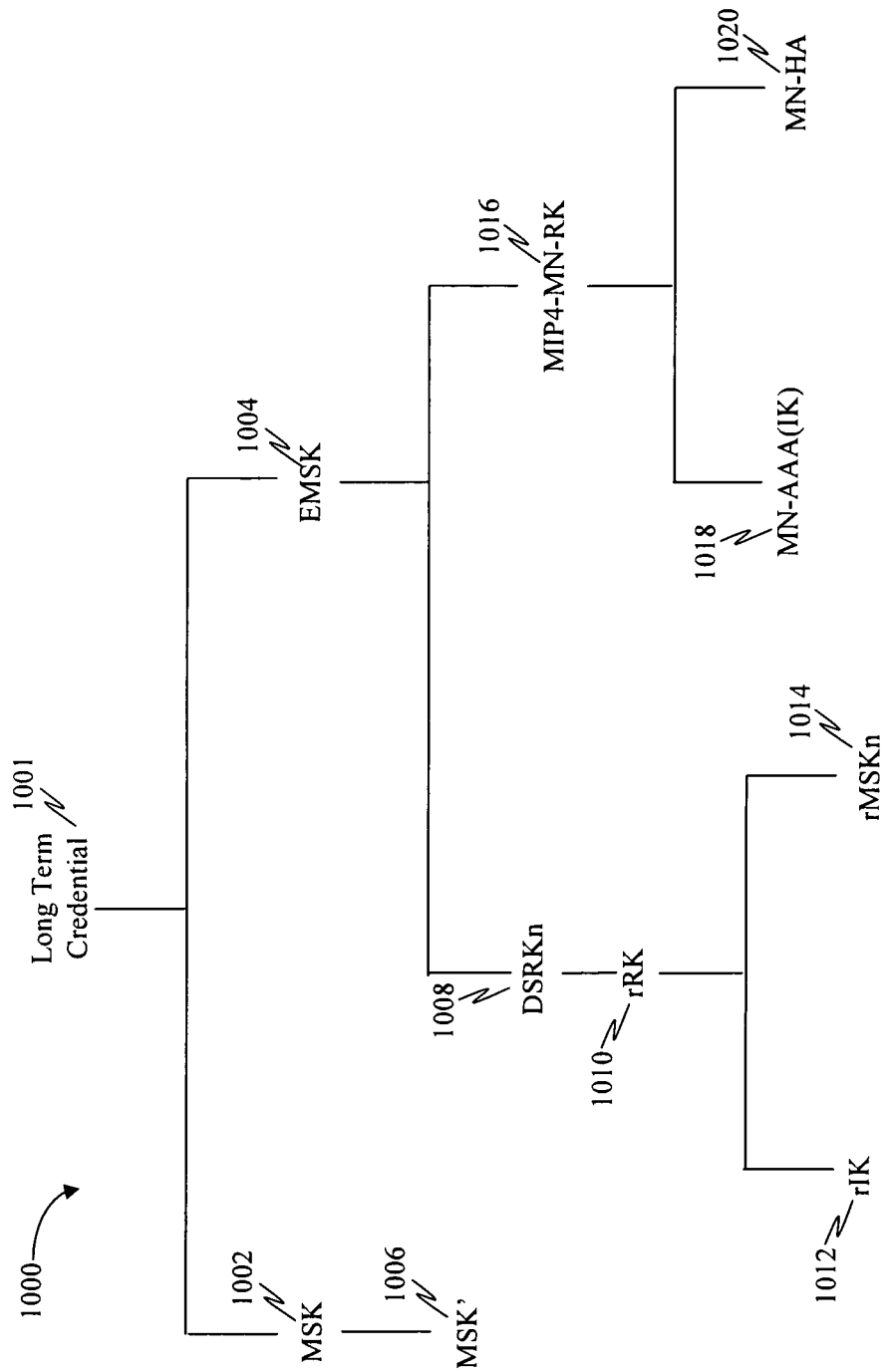
FIG. 10 is a diagram illustrating an example of a key hierarchy for an access terminal.

FIG. 10 is a diagram illustrating an example of a primary key hierarchy for an access terminal. When an Extensible Authentication Protocol (EAP) (or some other secure authentication protocol) is used for authentication of an access terminal (AT) by a network, a pre-configured Long Term Credential 1001 (e.g., a unique AT identifier or value, etc.) may be used to arrive at two keys, known as the Master Session Key (MSK) 1002 and the Extended Master Session Key (EMSK) 1004.

The MSK 1002 may be computed by the HAAA sent to the SRNC for derivation of session keys for securing traffic over the air. The EMSK 1004 may be stored in the AT and the AAA server, and it may be used to derive other keys for mobility or re-authentication at a later time. When an AT performs an initial EAP access authentication, the MSK 1002 is available to both the AT and SRNC. The AT may use the MSK 1002 to derive a session key MSK' 1006 (where MSK'=f (MSK)) to authenticate itself with a first access network (AN1). Subsequently, the AT may seek to attach to a second access network AN2 and may perform re-authentication, wherein a Domain Specific Root Key (DSRK) 1008 is delivered to a Local AAA server or AGW with which the re-authentication procedures can be performed. For re-authentication purposes, a Re-authentication Root Key (rRK) 1010 may be derived at the AT and Local AAA server/AGW. Anything under the rRK hierarchy may be specific to the re-authentication usage and eventually provides key material for deriving session keys for use with other access nodes. For example, a Re-authentication Integrity Key (rIK) 1012 and a re-authentication MSK (rMSK) key 1014.

For Mobile IPv4 security, the EMSK 1004 may be used to generate a specific Root Key (MIP4-MN-RK) 1016. The MIP4-MN-RK key 1016 is then used to compute an MN-AAA key 1018 that may be used by the AT to prove possession of valid key material at the time of Mobile IPv4 use (e.g., when a change request to a new access node eBS is received). After the AT is assigned a Home Agent (HA) for MIP4 purposes, an MN-HA key 1020 may also be derived from the MIP4-MN-RK 1016.

The MIP4-MN-RK key 1016 may be a pre-configured key for use in cases where EAP is not used for access authentication. For example, this may be the case for HRPD/1X systems that use MIPv4 enhancement for IP mobility. When transitioning from a HRPD network to a UMB network or vice-versa, the latest available MIP4-MN-RK key may be used to generate the MN-HA keys. The latest available key may be a dynamically derived MIP4-MN-RK key (from the EMSK 1004) when that is available or a pre-configured MIP4-MN-RK key when a dynamically derived key is not available. For example, when the AT starts up in an HRPD network, the pre-configured MIP4-MN-RK key will be used for MIP4 purposes. If the AT then transitions to a UMB network with the same MIP4 session, the MIP4-MN-RK key currently in use will continue to be used until it expires. If the AT starts up in a UMB network, it would have performed EAP and a dynamic MIP4-MN-RK key will be available. In that case, the dynamic MIP4-MN-RK key is used for MIP4 until the key expires, even if the AT subsequently moves to an HRPD network. If the dynamic MIP4-MN-RK key expires, the AT may then use whatever pre-configured or dynamic MIP4-MN-RK key is available at that time for generating the new MIP4 keys.

For Proxy Mobile IPv4 security (e.g., securing PMIP tunnels between network infrastructure nodes), a key hierarchy may be defined based on a random key (PMN-RK) that may be unique to an AT and may be picked by the Local AAA (LAAA) server or Access Gateway (AGW) at the time of initial access authentication.

Generation and Distribution of PMIP Key

As an AT roams or moves from a first eBS to a second eBS, the AGW managing communications for the AT establishes a proxy mobile IP (PMIP) tunnel to the new serving eBS. However, the AGW has to prevent other eBSs (or intruders) from claiming to be providing wireless connectivity to the AT when they are not. For example, in FIG. 1, if AT-1 106 were to change its serving access node from eBS-a 104 to eBS-b 107, the gateway AGW-a 112 should have a way to verify whether the change request to eBS-b 107 is valid. The AGW-a 112 may be able to prevent an unauthorized entity from changing the PMIP tunnel binding (e.g., between the gateway AGW-a 112 and the eBS-a 104/SRNC-a 114) by using a secure PMIP key for each tunnel binding.

There at least two types of PMIP tunnels, RAN PMIP tunnels between an eBS and AGW and Network PMIP tunnels between AGW and SRNC and between a first AGW and a second AGW. As an AT moves from first access node eBS-1 to a second access node eBS-2 (within an access network), a new RAN PMIP tunnel may be established by the AGW with the new serving eBS-2. Similarly, as the AT moves or roams into a new access or serving network, the home gateway AGW may establish a network PMIP tunnel with the new access or serving network. Upon moving to a new serving eBS-2, a new PMIP tunnel may be established with a new PMIP key.

Consequently, one feature provides for a proxy mobile-node home-agent (PMN-HA) key ("PMIP key") that may be used, for example, to bind or secure PMIP tunnels between an access node eBS and a gateway AGW and/or between a SRNC and the gateway AGW. That is, a secure key may be provided from the gateway AGW to an access node eBS that allows them to secure PMIP signaling in a PMIP tunnel between them.

Communication systems may implement a key hierarchy for deriving keys used for different purposes within the communication system. In some instances, a "master" key is assigned to an AT and may be used by the communication system and/or AT to derive other keys. The derived keys are generated as a function of the master key (and possibly other parameters) in such a way that the master key is not discoverable. Similarly, some derived keys may be used to securely derive other lower-lever keys.

In some instances, a primary key hierarchy, such as an EAP key hierarchy (FIG. 10), is maintained by an HAAA and an AT. The primary key hierarchy may be based on a master key uniquely associated with an AT and known to both the HAAA and AT. The primary key hierarchy may be used to derive keys used to authenticate the AT with the HAAA.

A secondary (PMIP) key hierarchy may be maintained by a network gateway (AGW) and used to verify requests to reroute/handoff a session or service to a new access node. This secondary key hierarchy may be known to the gateway AGW but not the AT. In some examples, a secondary key hierarchy may be based on a random key (PMN-RK) that is unique to an AT and known only to the gateway. A plurality of PMN-HA keys may be derived from the random root key (PMN-RK) of the secondary key hierarchy.

Figure 2:
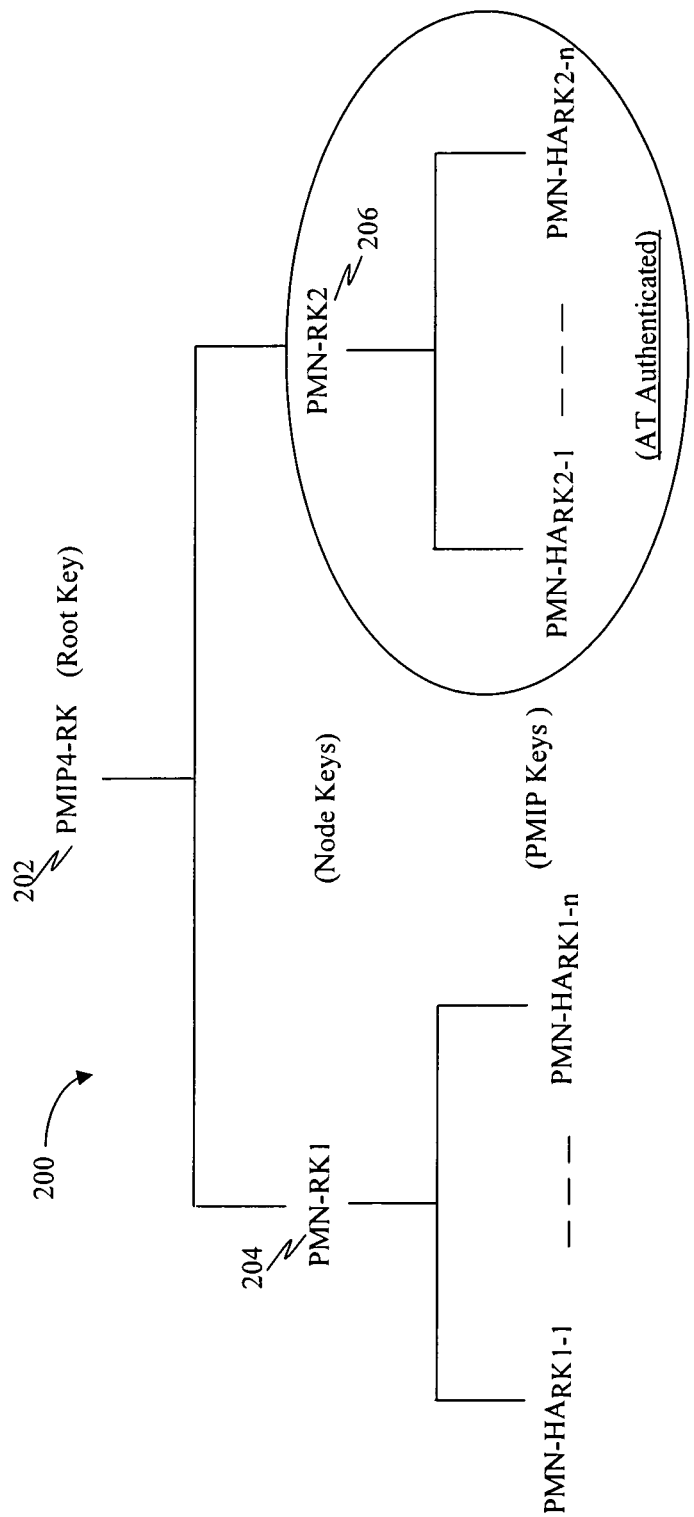
FIG. 2 is a diagram illustrating a secondary (PMIP) key hierarchy that may be maintained by a gateway for verifying handoff transfer requests according to one example.

FIG. 2 is a diagram illustrating a secondary (PMIP) key hierarchy that may be maintained by a gateway AGW for generating and/or distributing keys to secure PMIP tunnels according to one example. In this example, a root key PMIP4-RK 202 may be a random key selected by the gateway AGW. In one implementation, the key hierarchy 200 may have no correlation to upper level keys of a primary key hierarchy used for, e.g., authentication of the access terminal AT. For instance, the root key PMIP4-RK 202 in the secondary key hierarchy 200 may be a random key that is independent from a primary key hierarchy for an access terminal AT. In another implementation, the PMIP4-RK key 202 may be derived based on a higher-level key in the primary key hierarchy for an access terminal AT.

In one example, the gateway AGW may generate different node keys, PMN-RK1 and PMN-RK2, depending on whether the associated access terminal AT has been authenticated or not during the handoff or transfer to a new network access node (eBS). That is, because a non-authenticated access terminal AT may pose a greater risk of being compromised, the gateway AGW may utilize different keys. In this manner, PMIP tunnels for which the AT has not been authenticated can be secured with a first node key PMN-RK1 while PMIP tunnels for which the AT has been authenticated are secured with a second node key PMN-RK2. This assures that if the first node key PMN-RK1 becomes compromised, it will not compromise the AT as it moves to other access nodes where re-authentication may occur.

In a first mode of operation, where no authentication of the AT has occurred through a new serving access node, the first node key PMN-RK1 204 may be generated and used. The AGW generates the first node key PMN-RK1 and delivers it to an intermediary network node (SRNC) associated with the new serving access node. The intermediary network node SRNC then generates a PMIP key (PMN-HA$_{RK1-1}$) based on the first node key PMN-RK1 and, possibly other parameters, such as a counter or an access node identifier. The PMIP key (PMN-HA$_{RK1-1}$) is sent to the new serving access node and can then be used between the new serving access node and the gateway AGW to establish and/or secure a PMIP tunnel. Note that the other parameters (e.g., counter, access node identifier, etc.) with which the PMIP key (PMN-HA$_{RK1-1}$) is calculated may be known or provided to the gateway AGW so that it too generates generate the same PMIP key (PMN-HA$_{RK1-1}$) with which to setup or verify the PMIP tunnel.

In a second mode of operation, where authentication of the AT has occurred through the new serving access node, the second node key PMK-RK2 206 may be generated and used. In this instance, the second node key PMN-RK2 206 is retained at the gateway AGW and a second node key (PMN-HA$_{RK2-1}$) is calculated and sent directly to the new serving access node. In this instance, authentication of the AT may comprise performing an access authentication request (e.g., using either an EAP-AK protocol) or an access re-authentication request (e.g., using EAP Re-authentication Protocol (ERP)).

In various example, the same first node key PMN-RK1 204 may be used to generate a plurality of different PMIP keys (PMN-HA$_{RK1-1}$ ... PMN-HA$_{RK1-N}$) as the same access terminal AT moves or roams from one access node to another. Similarly, the second node key PMN-RK2 206 may be used to generate a plurality of different PMIP keys (PMN-HA$_{RK2-1}$ ... PMN-HA$_{RK2-N}$) as the access terminal AT moves or roams among different access nodes.

Since the access terminal AT does not need to know the PMIP keys PMN-HAx, the only entity "deriving" this key is the AGW. Hence, there is no need to derive the root key PMIP4-RK 202 since a simple strong random number generation is sufficient. The generated random number (i.e., root key PMIP4-RK) may be used as the seed for the AGW to generate the secondary key hierarchy for use in verifying whether a new PMIP tunnel (e.g. PMIPv4 tunnel) should be established.

Alternatively, a PMIP key (PMN-HAx) may be created from a primary (EAP) key hierarchy, as in the case of an authentication key.

In yet other implementations, no root key is used to generate the node keys PMN-RK1 204 and PMN-RK2 206. Instead, these two node keys may be independently generated. For instance, PMN-RK1 204 and PMN-RK2 206 may be randomly selected.

FIGS. 3-6 illustrate how an access gateway AGW may distribute PMIP keys to access nodes eBSs and/or session reference network controller SRNC in various scenarios.

Figure 3:
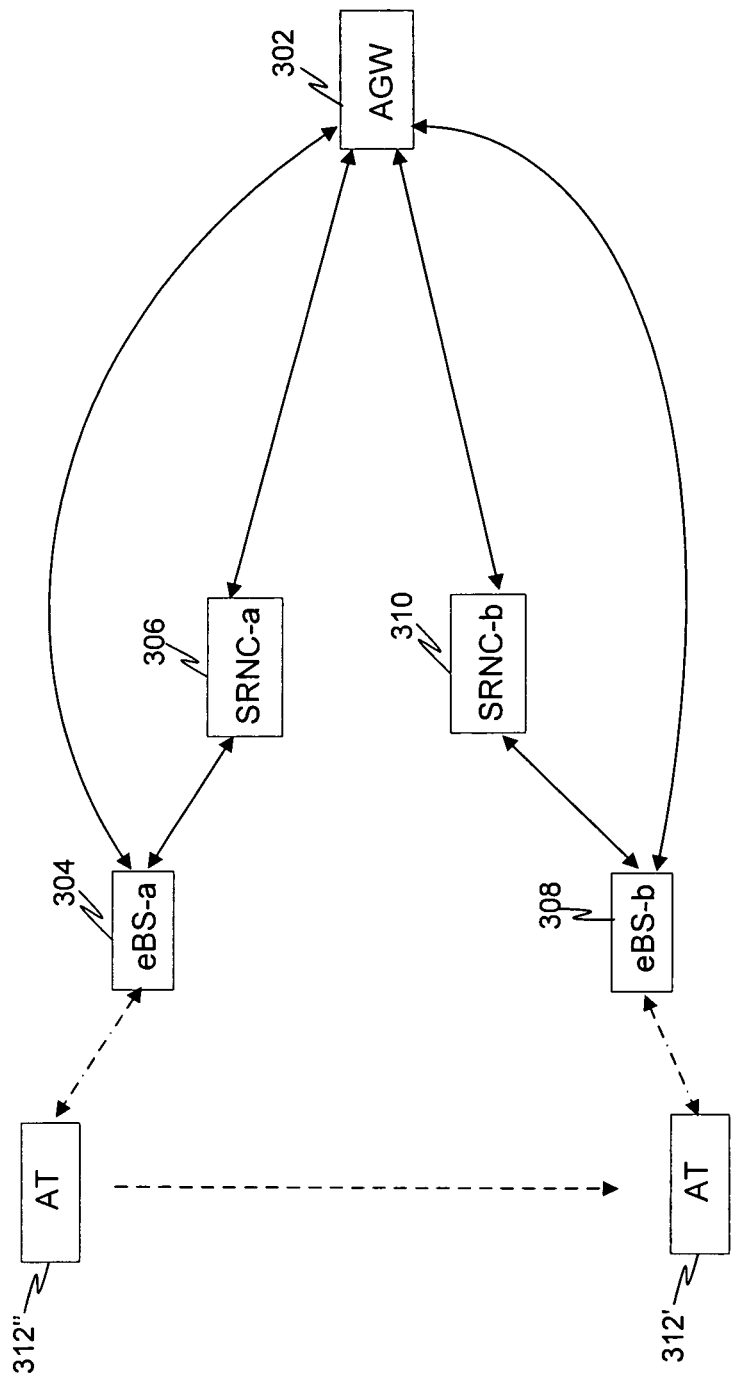
FIG. 3 is a block diagram illustrating a communication network in which an access terminal transfers communication services from a first access node to a second access node.

FIG. 3 is a block diagram illustrating a communication network in which an access terminal AT transfers communication services from a first access node eBS-a 304 to a second access node eBS-b 308.

Figure 4:
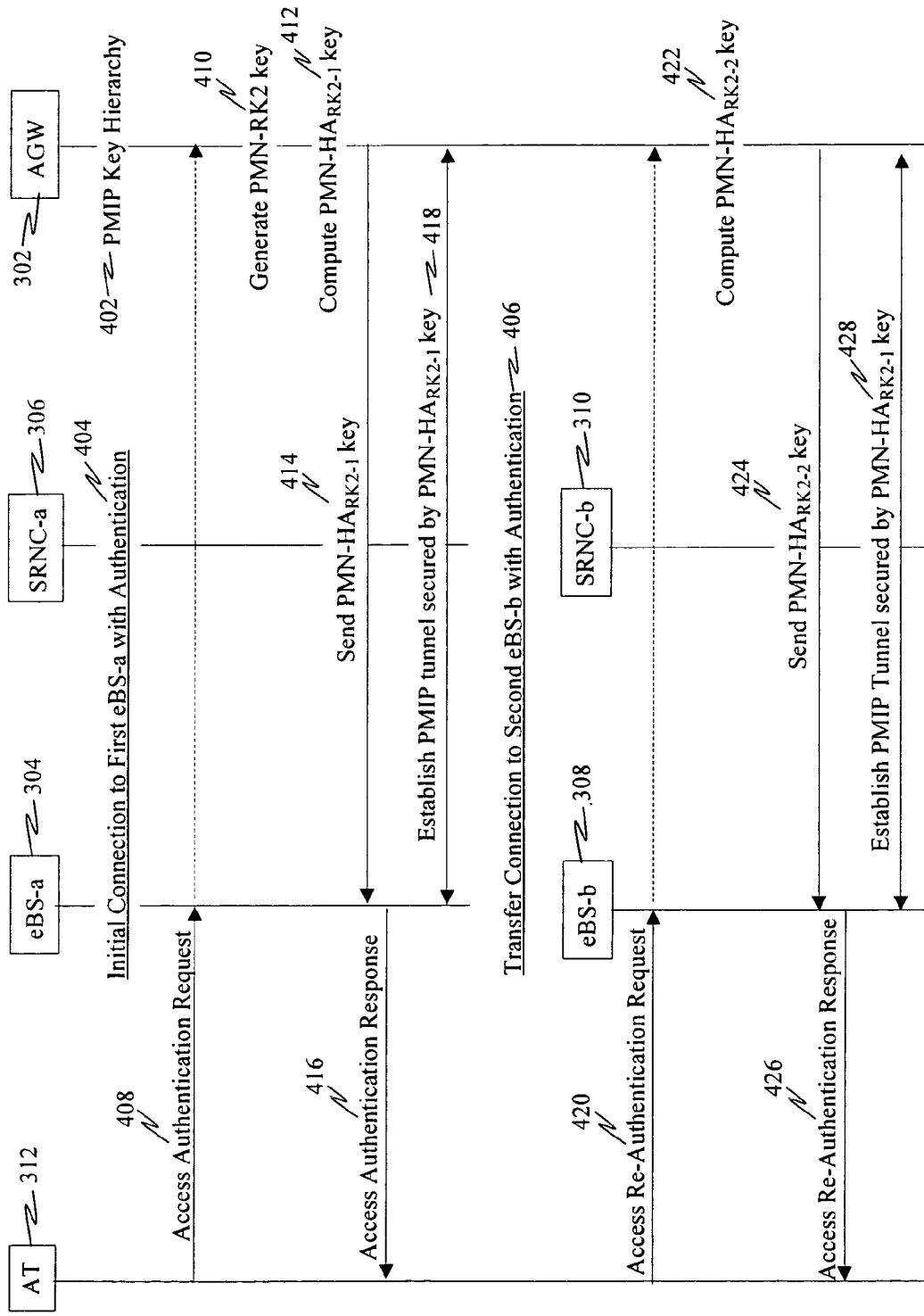
FIG. 4 is a flow diagram illustrating how a gateway may generate and distribute PMIP keys in the environment illustrated in FIG. 3 in the case where the access terminal is authenticated.

FIG. 4 is a flow diagram illustrating how a gateway may generate and distribute PMIP keys in the environment illustrated in FIG. 3 in the case where the access terminal AT is authenticated. In this example, the access terminal AT 312 is initially serviced by a first access node eBS-a 304 but moves or roams to a second access node eBS-b 308.

The gateways AGW 302 may maintain a PMIP key hierarchy 402. During an initial connection stage 404 to the first access node eBS-a 304, the AT 312 may initiate an access authentication request 408. The access authentication request 408 (e.g., EAP-AK) may be sent by the access terminal AT 312 via the access node AGW 302 to, for example, a home network HAAA for authentication. As part of this process, the access node AGW 302 may recognize that the access terminal AT 312 is undergoing authentication. Consequently, the access node AGW 302 may generate a first node key PMN-RK2 410. For instance, the first node key PMN-RK2 410 may be generated based on a root key PMIP4-RK or may be randomly generated. The first node key PMN-RK2 may then be used to compute a first PMIP key PMN-HA$_{RK2-1}$ 412. The keys PMN-RK2 and PMN-HA$_{RK2-1}$ may be maintained as part of the PMIP key hierarchy 402. The first PMIP key PMN-HA$_{RK2-1}$ is then sent 414 to the first access node eBS-a 304. In one example, the first PMIP key PMN-HA RK2-1 is sent as part of an authentication response. An access authentication response 416 may be sent by the first access node eBS-a 304 to the access terminal AT 312. Note that the procedure of the initial connection stage 404 may be performed when the access terminal AT 312 first sets up communication service through the communication network (of which eBS-a, SRNC-a and AGW are part) or when the AT 312 roams or moves to the eBS-a 304. A PMIP tunnel may then be established 418 between the first access node eBS-a 304 and the AGW 302.

During a subsequent handoff stage 406, the AT 312 may send an access re-authentication request 420 seeking to change its servicing access node to the second access node eBS-b 308. Because the re-authentication request 420 is performed using an authentication protocol, such as EAP-AK or ERP, the network can verify that the request really comes from the AT 312 (and not from an unauthorized entity). Since the AGW 302 will know that an authentication response is being sent back to the AT 312, it can determine it should use the first node key PMN-RK2 (which it uses only when an AT has been authenticated). The gateway AGW 302 then computes a second PMIP key PMN-HA$_{RK2\text{-}1}$ 422 based on the first node key PMN-RK2. The second PMIP key PMN-HA$_{RK2\text{-}1}$ is then sent 424 to the second access node eBS-b 308. An access re-authentication response 426 may also be sent by the second access node eBS-b 308 to the access terminal AT 312. The second PMIP key PMN-HA$_{RK2\text{-}1}$ can be subsequently used to establish a PMIP tunnel 428 between the second access node eBS-b 308 and the gateway AGW 302.

Figure 5:
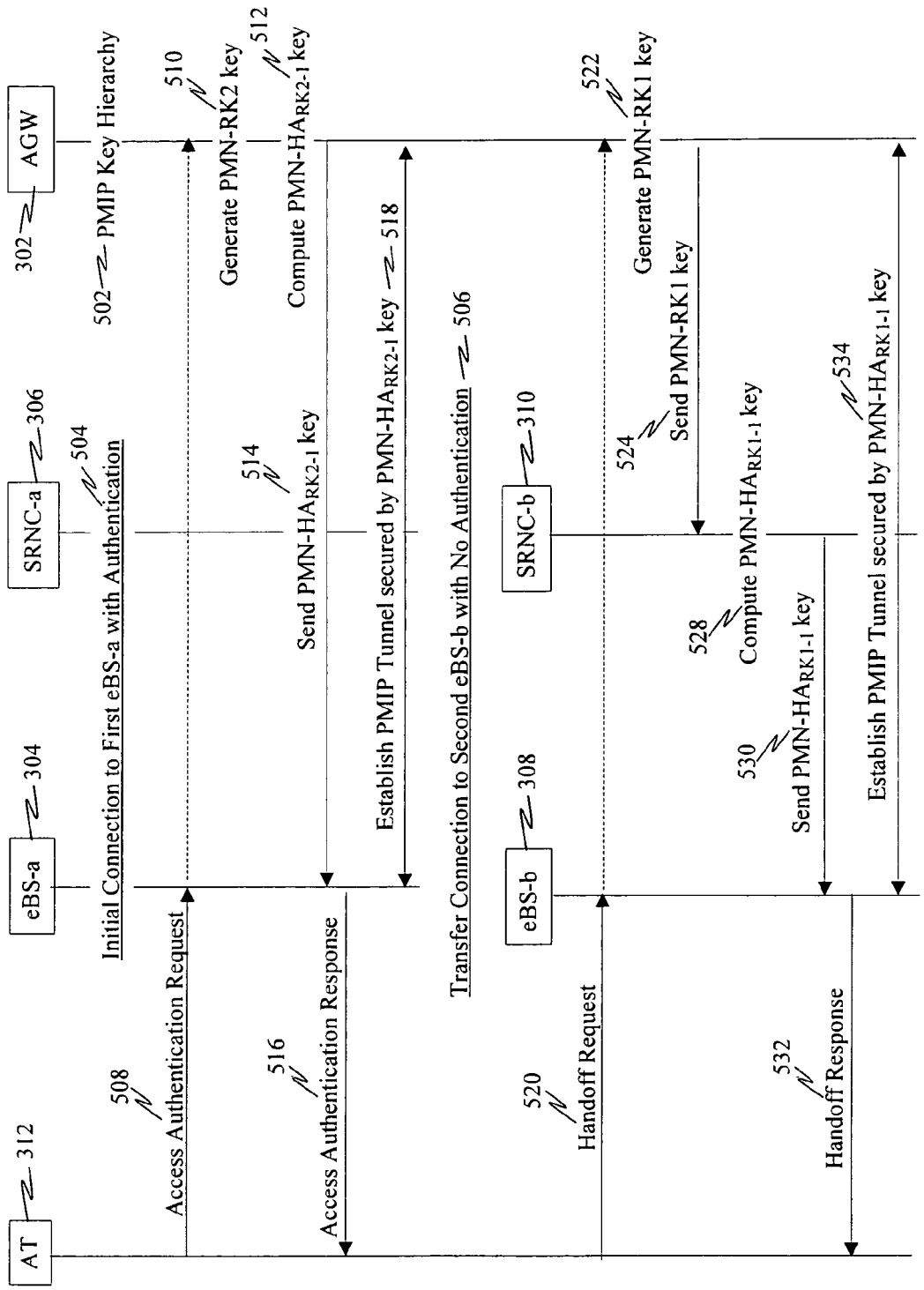
FIG. 5 is a flow diagram illustrating how a gateway may generate and distribute PMIP keys in the environment illustrated in FIG. 3 in the case where the access terminal AT is authenticated via a first access node but moves to a second access node without authentication.

FIG. 5 is a flow diagram illustrating how a gateway may generate and distribute PMIP keys in the environment illustrated in FIG. 3 in the case where the access terminal AT is authenticated via a first access node eBS-a 304 but moves to a second access node eBS-b 308 without authentication.

The gateway AGW 302 may maintain a PMIP key hierarchy 502. During an initial connection stage 504 to the first access node eBS-a 304, the access terminal AT 312 may initiate an access authentication request 508. The access authentication request 508 (e.g., EAP-AK) may be sent by the access terminal AT 312 via the gateway AGW 302 to, for example, a home network HAAA for authentication. As part of this process, the gateway AGW 302 may recognize that the access terminal AT 312 is undergoing authentication. Consequently, the gateway AGW 302 may generate a first node key PMN-RK2 510. For instance, the first node key PMN-RK2 510 may be generated based on a root key PMIP4-RK or may be randomly generated. The first node key PMN-RK2 may then be used to compute a first PMIP key PMN-HA$_{RK2\text{-}1}$ 512. The keys PMN-RK2 and PMN-HA$_{RK2\text{-}1}$ may be maintained as part of the PMIP key hierarchy 502. The first PMIP key PMN-HA$_{RK2\text{-}1}$ is then sent 514 to the first access node eBS-a 304. In one example, the first PMIP key PMN-HA$_{RK2\text{-}1}$ is sent as part of an authentication response. An access authentication response 516 may be sent by the first access node eBS-a 304 to the access terminal AT 312. Note that the procedure of the initial connection stage 504 may be performed when the access terminal AT 312 first sets up communication service through the communication network (of which eBS-a, SRNC-a and AGW are part) or when the AT 312 roams or moves to the eBS-a 304. A PMIP tunnel may then be established 518 between the first access node eBS-a 304 and the AGW 302.

During a subsequent handoff stage 506, the AT 312 may send a handoff request 520 seeking to change its servicing access node to the second access node eBS-b 308. Because the handoff request 520 is performed without authentication or re-authentication of the access terminal AT, the network cannot verify that the request really comes from the access terminal AT 312. Therefore, the gateway AGW 302 will know it should not use the first node key PMN-RK2 (which is used only when an AT has been authenticated). Instead, the gateway AGW 302 computes a second node key PMN-RK1 522 which is to be used only when the AT has not been authenticated. The second node key PMN-RK1 is sent 524 to the SRNC-b 310 (also referred to as "intermediate network node"). The SRNC-b 310 then computes a second PMIP key PMN-HA$_{RK1\text{-}1}$ 528 based on the second node key PMN-RK1 and, possibly, other parameters such as an access node identifier for eBS-b or a counter. The second PMIP key PMN-HA$_{RK1\text{-}1}$ is then sent 530 to the second access node eBS-b 308. A handoff response 532 may also be sent by the second access node eBS-b 308 to the access terminal AT 312. The second PMIP key PMN-HA$_{RK1\text{-}1}$ can be subsequently used to establish a PMIP tunnel 534 between the second access node eBS-b 308 and the gateway AGW 302.

Figure 6:
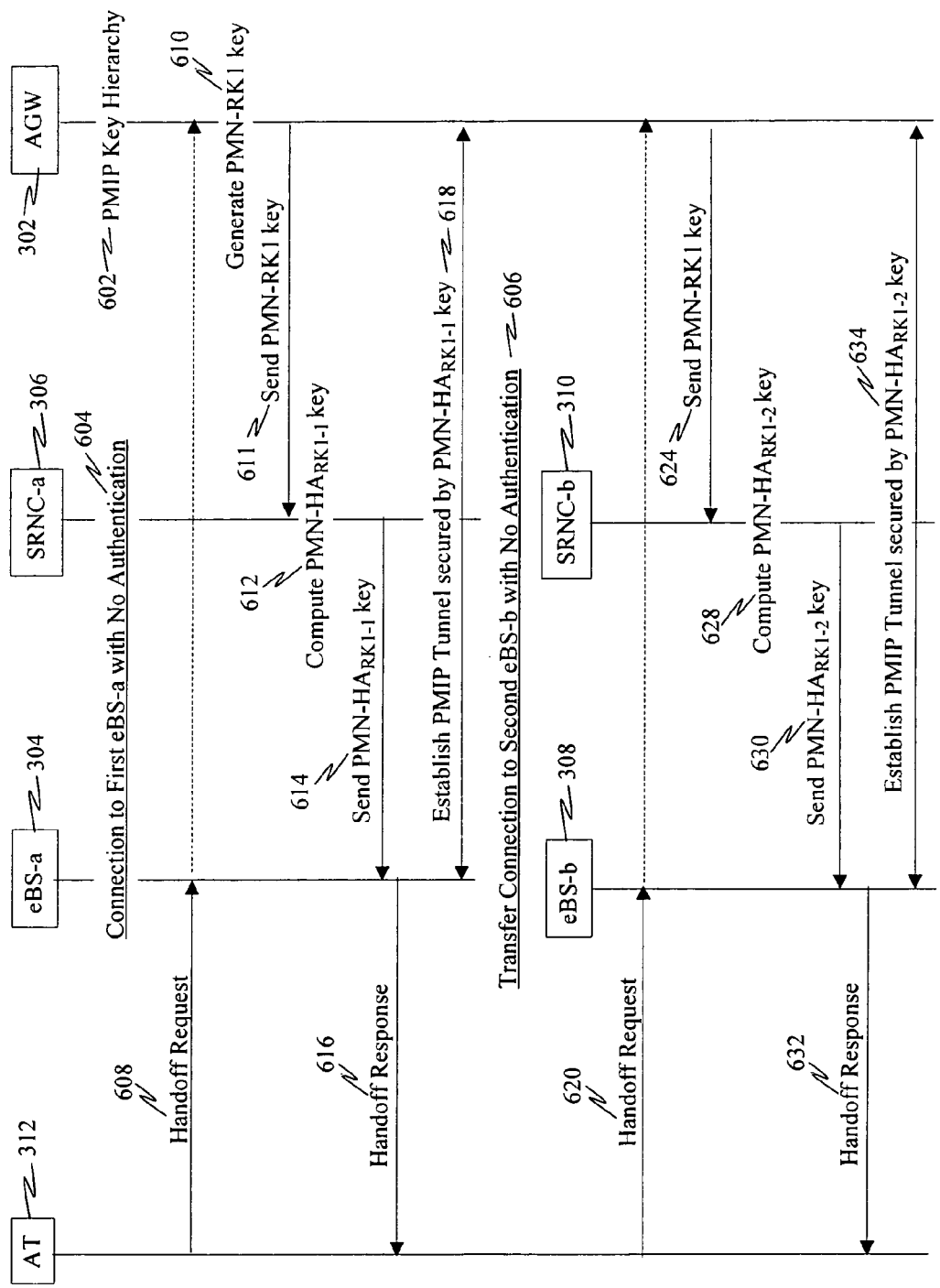
FIG. 6 is a flow diagram illustrating how a gateway may generate and distribute PMIP keys in the environment illustrated in FIG. 3 in the case where the access terminal is going from an unauthenticated connection with access node to another unauthenticated connection with second access node without authentication.

FIG. 6 is a flow diagram illustrating how a gateway may generate and distribute PMIP keys in the environment illustrated in FIG. 3 in the case where the access terminal AT is going from an unauthenticated connection with access node eBS-a 304 to another unauthenticated connection with second access node eBS-b 308 without authentication.

The gateway AGW 302 may maintain a PMIP key hierarchy 602. During a connection stage 604 to the first access node eBS-a 304, the access terminal AT 312 may initiate a handoff request 608 without authentication of the access terminal AT 312. As part of this process, the gateway AGW 302 may recognize that the access terminal AT 312 is transferring its connection to the first access node eBS-a 304 without authentication. Consequently, the gateway AGW 302 may generate a first node key PMN-RK1 610. For instance, the first node key PMN-RK1 610 may be generated based on a root key PMIP4-RK or may be randomly generated. The first node key PMN-RK1 may then be sent 611 to the SRNC-a 306 ("intermediary network node") associated with the first access node eBS-a 304. The SRNC-a 306 uses the first node key PMN-RK1 to compute a first PMIP key PMN-HA$_{RK1\text{-}1}$ 612. The keys PMN-RK1 and PMN-HA$_{RK1\text{-}1}$ may be maintained as part of the PMIP key hierarchy 602. The first PMIP key PMN-HA$_{RK1\text{-}1}$ is then sent 614 to the first access node eBS-a 304. A handoff response 616 may be sent by the first access node eBS-a 304 to the access terminal AT 312. Note that the procedure of the connection stage 604 may be performed when the access terminal AT 312 first sets up communication service through the communication network (of which eBS-a, SRNC-a and AGW are part) or when the AT 312 roams or moves to the eBS-a 304. A PMIP tunnel may then be established 618 between the first access node eBS-a 304 and the gateway AGW 302.

During a subsequent handoff stage 606, the AT 312 may send a handoff request 520 seeking to change its servicing access node to the second access node eBS-b 308. Because the handoff request 620 is performed without authentication or re-authentication of the access terminal AT 312, the network cannot verify that the request really comes from the access terminal AT 312. Therefore, the gateway AGW 302 will know it should use the first node key PMN-RK1 (which is used only when an AT has been not authenticated). The gateway AGW 302 sends the first node key PMN-RK1 524 to the SRNC-b 310 (also referred to as "intermediate network node"). The SRNC-b 310 then computes a second PMIP key PMN-HA$_{RK1\text{-}2}$ 628 based on the first node key PMN-RK1 and, possibly, other parameters such as an access node identifier for eBS-b or a counter. The second PMIP key PMN-HA$_{RK1\text{-}2}$ is then sent 630 to the second access node eBS-b 308. A handoff response 632 may also be sent by the second access node eBS-b 308 to the access terminal AT 312. The second PMIP key PMN-HA$_{RK1\text{-}2}$ can be subsequently used to establish a PMIP tunnel 634 between the second access node eBS-b 308 and the gateway AGW 302.

Note that when an access terminal AT moves between two access nodes that are coupled to the same SRNC and no authentication of the access terminal AT is performed for either connection, the SRNC will already have the node key PMN-RK1. Therefore, the SRNC can simply compute a new PMIP key for the new access terminal. When establishing a PMIP tunnel, the new access terminal can simply send the new PMIP key and parameters used to generate it to the gateway AGW. The gateway AGW, having knowledge of the node key PMN-RK1 can then regenerate the new PMIP key for verification.

Figure 7:
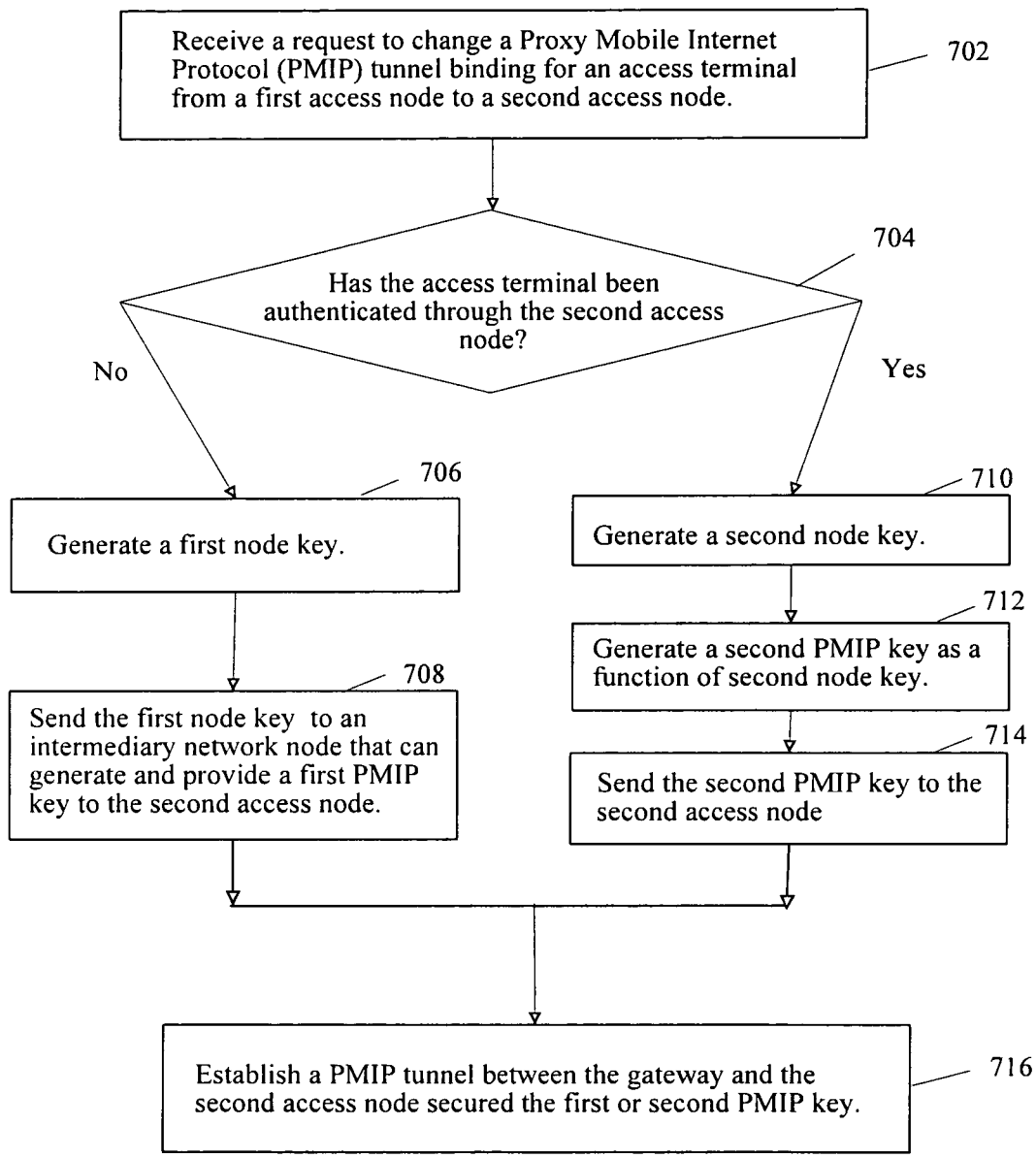
FIG. 7 illustrates a method operational in a network gateway for generating keys used to secure PMIP tunnels in a communication network.

FIG. 7 illustrates a method operational in a network gateway for generating keys used to secure PMIP tunnels in a communication network. In one example, the gateway may operate in an Ultra Mobile Broadband (UMB) compatible network. The gateway may receive a request to change a Proxy Mobile Internet Protocol (PMIP) tunnel binding for an access terminal from a first access node to a second access node 702. Such request may be part of an authentication or re-authentication procedure or it may be part of handoff request procedure. The gateway may then determine whether the access terminal has been authenticated through the second access node 704. That is, the gateway may determine whether in the request to transfer communication service from a previous access node to a new access node has been authenticated as coming from the access terminal. This may be performed, for example, through an EAP-AK procedure or an ERP procedure. If the access terminal has not been authenticated through the new access node, then the gateway generates a first node key 706 and sends the first node key to an intermediary network node (e.g., SRNC) that can generate and provide a first PMIP key to the second access node 708. Otherwise, the gateway generates a second node key 710, generates a second PMIP key as a function of second node key, and sends the second PMIP key to the second access node 714.

In various implementations, the first node key and second node key may be based on a common root key, a randomly selected root key, or they may be independent from each other (i.e., the first and second node keys may each be randomly selected). Note that the first node key and second node key may be unknown to the access terminal since it is only used for PMIP bindings within the network. Consequently, the PMIP key hierarchy (e.g., first node key, second node key, PMIP keys, etc.) may be independent of a primary (EAP) key hierarchy known to the access terminal and used to authenticate the access terminal.

The gateway may subsequently establish a PMIP tunnel between the gateway and the second access node using either the first PMIP key or the second PMIP key 716. That is, if the first node key was sent, then the first PMIP key is used to setup and secure the PMIP tunnel. In that case, the gateway can generate a local version of the first PMIP key using parameters known to both the gateway and intermediary network node. For example, the gateway and intermediary network node may use a counter known to both, an identifier value for the second access node, or some other parameter to generate the first node key. In establishing the PMIP tunnel, the second access node may provide the gateway a copy of the first PMIP key along with parameters used to generate it (except the first node key). Otherwise, if the second PMIP key was sent, the gateway already knows this key and can verify that the second access node does too before accepting PMIP tunnel binding to the second access node.

Figure 8:
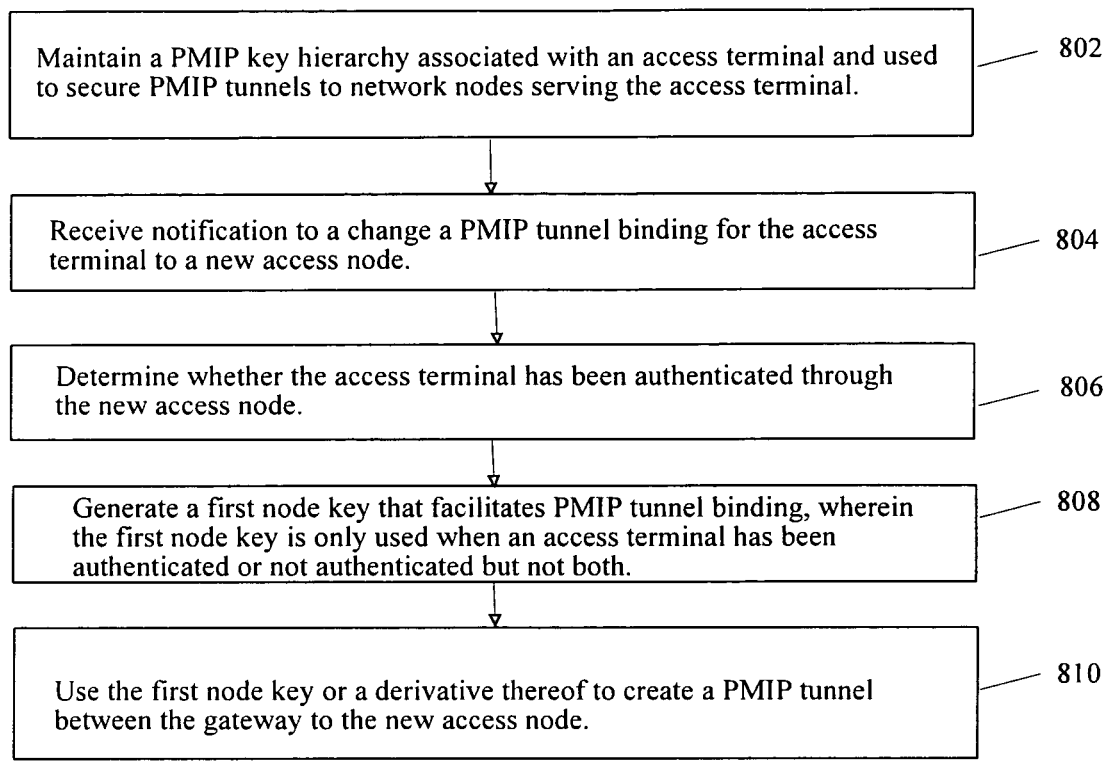
FIG. 8 illustrates a method operational in a network gateway for generating and distributing keys used to secure PMIP tunnels for a particular access terminal in a communication network.

FIG. 8 illustrates a method operational in a network gateway for generating and distributing keys used to secure PMIP tunnels for a particular access terminal in a communication network. The gateway may maintain a PMIP key hierarchy associated with an access terminal and used to secure PMIP tunnels to network nodes serving the access terminal 802. The gateway may receive notification to a change a PMIP tunnel binding for the access terminal to a new access node 804. It may determine whether the access terminal has been authenticated through the new access node 806. A first node key is then generated that facilitates PMIP tunnel binding; however, the first node key is only used when an access terminal has been authenticated or not authenticated but not both 808. That is, separate node keys are used for tunnel bindings where the access terminal has been authenticated and where the terminal has not been authenticated. The first node key may be used by the gateway or an intermediary network node to generate a PMIP key. That is, the first node key or a derivative thereof (i.e., PMIP key) is used to create a PMIP tunnel between the gateway to the new access node 810.

Figure 9:
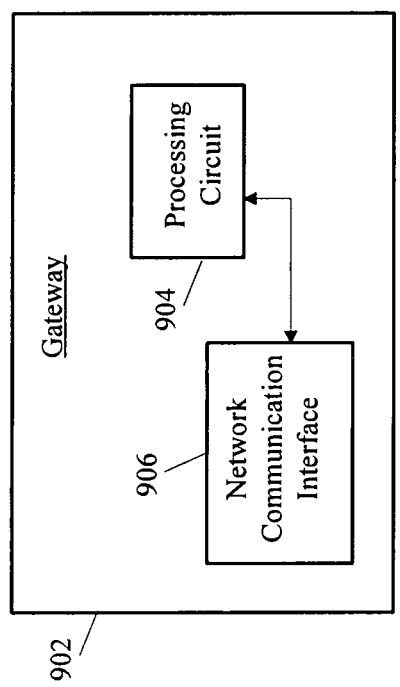
FIG. 9 is a block diagram illustrating an example of a gateway device.

FIG. 9 is a block diagram illustrating an example of a gateway device. The gateway device 902 may include a processing circuit 904 coupled to a network communication interface 906. The processing circuit 904 may be adapted to maintain a secondary (PMIP) key hierarchy and perform one or more of the steps illustrated in FIGS. 2-8 for generating and distributing PMIP keys differently depending on whether the access terminal has undergone successful authentication.

According to yet another configuration, a circuit may be adapted to receive a request to change a Proxy Mobile Internet Protocol (PMIP) tunnel binding for an access terminal from a first access node to a second access node. The same circuit, a different circuit, or a second section of the same or different circuit may be adapted to determine whether the access terminal been authenticated through the second access node. In addition, the same circuit, a different circuit, or a third section of the same or different circuit may be adapted to generate a first node key, if the access terminal has not been authenticated, and send the first node key to an intermediary network node that can generate and provide a first PMIP key to the second access node. Similarly, the same circuit, a different circuit, or a fourth section may be adapted to generate a second node key, if the access terminal has been authenticated, and generate a second PMIP key as a function of second node key and send the second PMIP key to the second access node. The same circuit, a different circuit, or a fourth section may be adapted to establish a PMIP tunnel between the gateway and the second access node secured the first or second PMIP key.

One of ordinary skill in the art will recognize that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

One or more of the components, steps, and/or functions illustrated in FIGS. 1, 2, 3, 4, 5, 6, 7, 8, 9, and/or 10 may be rearranged and/or combined into a single component, step, or function or embodied in several components, steps, or functions. Additional elements, components, steps, and/or functions may also be added. The apparatus, devices, and/or components illustrated in FIGS. 1, 3, and 9 may be configured or adapted to perform one or more of the methods, features, or steps described in FIGS. 2, 4-8 and/or 10. The algorithms described herein may be efficiently implemented in software and/or embedded hardware.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on an access gateway of a serving network equipped to relay communications among one or more access networks and a home network, the method comprising:
    receiving, at the access gateway of the serving network, a request to change a Proxy Mobile Internet Protocol (PMIP) tunnel binding for an access terminal associated with a home network from a first access node to a second access node where the access terminal is connected to the serving network via an access network;
    generating a first node key at the access gateway of the serving network; and
    sending the first node key from the access gateway of the serving network to an intermediary network node of an access network that can generate and provide a first PMIP key to the second access node.

2. The method of claim 1, further comprising:
    establishing a PMIP tunnel between the access gateway and the second access node secured by the first PMIP key.

3. The method of claim 1, further comprising:
    determining whether the access terminal has been authenticated through the second access node; and
    generating and sending the first node key only if the access terminal has not been authenticated.

4. The method of claim 3 wherein if the access terminal has been authenticated, further comprising:
    generating a second node key at the access gateway;
    generating a second PMIP key as a function of the second node key; and
    sending the second PMIP key from the access gateway to the second access node.

5. The method of claim 4, wherein the first node key and second node key are randomly selected and independent from each other.

6. The method of claim 4, wherein the first node key and second node key are based on a root key.

7. The method of claim 3, wherein the access terminal is authenticated if an Extensible Authentication Protocol (EAP) Re-authentication Protocol (ERP) is used.

8. The method of claim 1, wherein the intermediary network node is a session reference network controller (SRNC).

9. The method of claim 1, further comprising:
    maintaining a PMIP key hierarchy associated with the access terminal (AT) and used to secure PMIP tunnels to network nodes serving the access terminal, wherein the key hierarchy includes the first node key.

10. The method of claim 9, wherein the PMIP key hierarchy includes a randomly selected root key from which the first node key is derived.

11. The method of claim 10, wherein the root key for the PMIP key hierarchy is unknown to the access terminal.

12. The method of claim 9, wherein the PMIP key hierarchy is independent of a primary key hierarchy known to the access terminal and used to authenticate the access terminal.

13. The method of claim 1, wherein the first node key is randomly selected.

14. The method of claim 1, wherein the second access node is an enhanced base station (eBS).

15. The method of claim 1, wherein the second access node provides wireless connectivity to the access terminal.

16. The method of claim 1, wherein the access gateway operates in an Ultra Mobile Broadband (UMB) compatible network and the access gateway is distinct from an authentication, authorization, and accounting (AAA) server and a packet data serving node (PDSN).

17. An access gateway of a serving network equipped to relay communications among one or more access networks and a home network, comprising:
    a network interface;
    a processing circuit communicatively coupled to the network interface and adapted to facilitate communications to and from a wireless access device, the processing circuit configured to
        receive, at the access gateway of the serving network, a request to change a Proxy Mobile Internet Protocol (PMIP) tunnel binding for an access terminal associated with a home network from a first access node to a second access node where the access terminal is connected to the serving network via an access network,
        generate a first node key at the access gateway of the serving network, and
        send the first node key from the access gateway of the serving network to an intermediary network node of an access network that can generate and provide a first PMIP key to the second access node.

18. The access gateway of claim 17, wherein the processing circuit is further configured to:
    establish a PMIP tunnel between the access gateway and the second access node secured the first PMIP key.

19. The access gateway of claim 17, wherein the processing circuit is further configured to:
    determine whether the access terminal has been authenticated through the second access node; and
    generate and send the first node key only if the access terminal has not been authenticated.

20. The access gateway of claim 19, wherein if the access terminal has been authenticated, the processing circuit is further configured to:
    generate a second node key at the access gateway;
    generate a second PMIP key as a function of the second node key; and
    send the second PMIP key from the access gateway to the second access node.

21. The access gateway of claim 20, wherein the first node key and second node key are randomly selected and independent from each other.

22. The access gateway of claim 20, wherein the first node key and second node key are based on a root key.

23. The access gateway of claim 19, wherein the access terminal is authenticated if an Extensible Authentication Protocol (EAP) Re-authentication Protocol (ERP) is used.

24. The access gateway of claim 17, wherein the intermediary network node is a session reference network controller (SRNC).

25. The access gateway of claim 17, wherein the processing circuit is further configured to:
    maintain a PMIP key hierarchy associated with the access terminal (AT) and used to secure PMIP tunnels to network nodes serving the access terminal, wherein the key hierarchy includes the first node key.

26. The access gateway of claim 25, wherein the PMIP key hierarchy includes a randomly selected root key from which the first node key is derived.

27. The access gateway of claim 25, wherein the root key for the PMIP key hierarchy is unknown to the access terminal.

28. The access gateway of claim 25, wherein the PMIP key hierarchy is independent of a primary key hierarchy known to the access terminal and used to authenticate the access terminal.

29. The access gateway of claim 17, wherein the second access node is an enhanced base station (eBS).

30. An access gateway of a serving network equipped to relay communications among one or more access networks and a home network, comprising:
 means for receiving, at the access gateway of the serving network, a request to change a Proxy Mobile Internet Protocol (PMIP) tunnel binding for an access terminal associated with a home network from a first access node to a second access node where the access terminal is connected to the serving network via an access network;
 means for generating a first node key at the access gateway of the serving network; and
 means for sending the first node key from the access gateway of the serving network to an intermediary network node of an access network that can generate and provide a first PMIP key to the second access node.

31. The access gateway of claim 30, further comprising:
 means for establishing a PMIP tunnel between the access gateway and the second access node secured by the first PMIP key.

32. The access gateway of claim 30, further comprising:
 means for determining whether the access terminal has been authenticated through the second access node;
 wherein the first node key is generated and sent only if the access terminal has not been authenticated.

33. The access gateway of claim 32, further comprising:
 means for generating a second node key if the access terminal has been authenticated;
 means for generating a second PMIP key as a function of second node key if the access terminal has been authenticated; and
 means for sending the second PMIP key to the second access node.

34. The access gateway of claim 30, further comprising:
 means for maintaining a PMIP key hierarchy associated with the access terminal (AT) and used to secure PMIP tunnels to network nodes serving the access terminal, wherein the key hierarchy includes the first node key.

35. A circuit operational in an access gateway of a serving network equipped to relay communications among one or more access networks and a home network, wherein the circuit is adapted to:
 receive, at the access gateway of the serving network, a request to change a Proxy Mobile Internet Protocol (PMIP) tunnel binding for an access terminal associated with a home network from a first access node to a second access node where the access terminal is connected to the serving network via an access network;
 generate a first node key at the access gateway of the serving network; and
 send the first node key from the access gateway of the serving network to an intermediary network node of an access network that can generate and provide a first PMIP key to the second access node.

36. The circuit of claim 35, wherein the circuit is further adapted to:
 establish a PMIP tunnel between the access gateway and the second access node secured by the first PMIP key.

37. The circuit of claim 35, wherein the circuit is further adapted to:
 determine whether the access terminal has been authenticated through the second access node; and
 generate and send the first node key only if the access terminal has not been authenticated.

38. The circuit of claim 37, wherein if the access terminal has been authenticated, the circuit is further adapted to:
 generate a second node key;
 generate a second PMIP key as a function of the second node key; and
 send the second PMIP key to the second access node.

39. The circuit of claim 35, wherein the circuit is further adapted to:
 maintain a PMIP key hierarchy associated with the access terminal (AT) and used to secure PMIP tunnels to network nodes serving the access terminal, wherein the key hierarchy includes the first node key.

40. A non-transitory machine-readable medium comprising instructions for operating an access gateway of a serving network equipped to relay communications among one or more access networks and a home network, which when executed by a processor causes the processor to:
 receive, at the access gateway of the serving network, a request to change a Proxy Mobile Internet Protocol (PMIP) tunnel binding for an access terminal associated with a home network from a first access node to a second access node where the access terminal is connected to the serving network via an access network;
 generate a first node key at the access gateway of the serving network; and
 send the first node key from the access gateway of the serving network to an intermediary network node of an access network that can generate and provide a first PMIP key to the second access node.

41. The non-transitory machine-readable medium of claim 40 further comprising instructions to:
 establish a PMIP tunnel between the access gateway and the second access node secured by the first PMIP key.

42. The non-transitory machine-readable medium of claim 40 further comprising instructions to:
 determine whether the access terminal has been authenticated through the second access node; and
 generate and send the first node key only if the access terminal has not been authenticated.

43. The non-transitory machine-readable medium of claim 42, wherein if the access terminal has been authenticated, further comprising instructions to:
 generate a second node key;
 generate a second PMIP key as a function of the second node key; and
 send the second PMIP key to the second access node.

44. The non-transitory machine-readable medium of claim 40 further comprising instructions to:
 maintain a PMIP key hierarchy associated with the access terminal (AT) and used to secure PMIP tunnels to network nodes serving the access terminal, wherein the key hierarchy includes the first node key.

45. A method operational in an access gateway of a serving network equipped to relay communications among one or more access networks and a home network, comprising:
 receiving, at the access gateway of the serving network, a request to change a Proxy Mobile Internet Protocol (PMIP) tunnel binding for an access terminal associated with a home network from a first access node to a second access node where the access terminal is connected to the serving network via an access network;
 generating a first node key at the access gateway of the serving network;
 generating a first PMIP key at the access gateway of the serving network as a function of the first node key; and sending the first PMIP key from the access gateway of the serving network to the second access node.

46. The method of claim 45, further comprising:
establishing a PMIP tunnel between the access gateway and the second access node secured by the first PMIP key.

47. The method of claim 45, further comprising:
determining whether the access terminal has been authenticated through the second access node; and
generating and sending the first PMIP key only if the access terminal has been authenticated.

48. The method of claim 47, wherein if the access terminal has not been authenticated, further comprising:
generating a second node key; and
sending the second node key to an intermediary network node that can generate and provide a second PMIP key to the second access node.

49. The method of claim 48, wherein the intermediary network node is a session reference network controller (SRNC).

50. The method of claim 48, wherein the first node key and second node key are randomly selected and independent from each other.

51. The method of claim 48, wherein the first node key and second node key are based on a root key.

52. The method of claim 45, wherein the second access node is an enhanced base station (eBS).

53. The method of claim 45, further comprising:
maintaining a PMIP key hierarchy associated with the access terminal (AT) and used to secure PMIP tunnels to network nodes serving the access terminal, wherein the key hierarchy includes the first node key.

54. The method of claim 53, wherein the PMIP key hierarchy includes a randomly selected root key from which the first node key is derived.

55. The method of claim 53, wherein the root key for the PMIP key hierarchy is unknown to the access terminal.

56. The method of claim 45, wherein the first node key is randomly selected.

57. An access gateway of a serving network equipped to relay communications among one or more access networks and a home network, comprising:
a network interface;
a processing circuit communicatively coupled to the network interface and adapted to facilitate communications to and from a wireless access device, the processing circuit configured to
receive, at the access gateway of the serving network, a request to change a Proxy Mobile Internet Protocol (PMIP) tunnel binding for an access terminal associated with a home network from a first access node to a second access node where the access terminal is connected to the serving network via an access network,
generate a first node key at the access gateway of the serving network,
generate a first PMIP key at the access gateway of the serving network as a function of the first node key, and
send the first PMIP key from the access gateway of the serving network to the second access node.

58. The access gateway of claim 57, wherein the processing circuit is further adapted to:
establish a PMIP tunnel between the access gateway and the second access node secured by the first PMIP key.

59. The access gateway of claim 57, wherein the processing circuit is further adapted to:
determine whether the access terminal has been authenticated through the second access node; and
generate and send the first node key only if the access terminal has been authenticated.

60. The access gateway of claim 59, wherein if the access terminal has not been authenticated, the processing circuit is further adapted to:
generate a second node key; and
send the second node key to an intermediary network node that can generate and provide a second PMIP key to the second access node.

61. The access gateway of claim 60, wherein the intermediary network node is a session reference network controller (SRNC).

62. The access gateway of claim 57, wherein the second access node is an enhanced base station (eBS).

63. The access gateway of claim 57, wherein the processing circuit is further adapted to:
maintain a PMIP key hierarchy associated with the access terminal (AT) and used to secure PMIP tunnels to network nodes serving the access terminal, wherein the key hierarchy includes the first node key.

64. An access gateway of a serving network equipped to relay communications among one or more access networks and a home network, comprising:
means for receiving, at the access gateway of the serving network, a request to change a Proxy Mobile Internet Protocol (PMIP) tunnel binding for an access terminal associated with a home network from a first access node to a second access node where the access terminal is connected to the serving network via an access network;
means for generating a first node key at the access gateway of the serving network;
means for generating a first PMIP key at the access gateway of the serving network as a function of the first node key; and
means for sending the first PMIP key from the access gateway of the serving network to the second access node.

65. A circuit operational in an access gateway of a serving network equipped to relay communications among one or more access networks and a home network, wherein the circuit is adapted to:
receive, at the access gateway of the serving network, a request to change a Proxy Mobile Internet Protocol (PMIP) tunnel binding for an access terminal associated with a home network from a first access node to a second access node where the access terminal is connected to the serving network via an access network;
generate a first node key at the access gateway of the serving network;
generate a first PMIP key at the access gateway of the serving network as a function of the first node key; and
send the first PMIP key from the access gateway of the serving network to the second access node.

66. A non-transitory machine-readable medium comprising instructions for operating an access gateway of a serving network equipped to relay communications among one or more access networks and a home network, which when executed by a processor causes the processor to:
receive, at the access gateway of the serving network, a request to change a Proxy Mobile Internet Protocol (PMIP) tunnel binding for an access terminal associated with a home network from a first access node to a second access node where the access terminal is connected to the serving network via an access network;

generate a first node key at the access gateway of the serving network;
generate a first PMIP key at the access gateway of the serving network as a function of the first node key; and
send the first PMIP key from the access gateway of the serving network to the second access node.

\* \* \* \* \*